US007085643B2

(12) United States Patent
Muto et al.

(10) Patent No.: US 7,085,643 B2

(45) Date of Patent: Aug. 1, 2006

(54) DEVICE FOR ESTIMATING AN AMOUNT OF INTAKE AIR OF AN INTERNAL COMBUSTION ENGINE

(75) Inventors: Harufumi Muto, Nishikamo-gun (JP); Isamu Toshimitsu, Toyota (JP); Takahiro Anami, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/529,942

(22) PCT Filed: Jun. 30, 2004

(86) PCT No.: PCT/JP2004/009580

§ 371 (c)(1), (2), (4) Date: Apr. 1, 2005

(87) PCT Pub. No.: WO2005/005812

PCT Pub. Date: Jan. 20, 2005

(65) Prior Publication Data

US 2006/0100770 A1 May 11, 2006

(30) Foreign Application Priority Data

Jul. 10, 2003 (JP) ............................ 2003-195233

(51) Int. Cl.

*G06F 17/00* (2006.01)
*F02D 41/18* (2006.01)
*F02D 45/00* (2006.01)
*G01M 19/00* (2006.01)

(52) U.S. Cl. .................. 701/103; 73/118.2; 73/861.52

(58) Field of Classification Search ................ 123/399, 123/403; 73/116, 117.3, 118.1, 118.2, 861.42, 73/861.52; 701/101, 102, 103, 110

See application file for complete search history.

(56) References Cited

U.S. PATENT DOCUMENTS

| | | | | |
|---|---|---|---|---|
| 5,597,951 | A * | 1/1997 | Yoshizaki et al. | 73/118.2 |
| 5,653,212 | A * | 8/1997 | Hotta et al. | 73/117.3 |
| 6,182,645 | B1 * | 2/2001 | Tsuchiya | 123/568.23 |
| 6,298,299 | B1 * | 10/2001 | Itoyama et al. | 701/101 |
| 6,571,767 | B1 | 6/2003 | Kobayashi et al. | 123/399 |
| 6,662,640 | B1 * | 12/2003 | Yagi | 73/118.2 |
| 6,868,327 | B1 * | 3/2005 | Muto | 701/103 |

FOREIGN PATENT DOCUMENTS

| | | |
|---|---|---|
| JP | U 02-144635 | 12/1990 |
| JP | A 05-44564 | 2/1993 |
| JP | A 09-068092 | 3/1997 |
| JP | A 2002-070663 | 3/2002 |
| JP | A 2002-130039 | 5/2002 |
| JP | A 2002-201998 | 7/2002 |

* cited by examiner

*Primary Examiner*—Willis R. Wolfe, Jr.
(74) *Attorney, Agent, or Firm*—Oliff & Berridge, PLC

(57) ABSTRACT

In a device for estimating an amount of intake air of an internal combustion engine, wherein an amount of intake air passing through the throttle valve is calculated by using of an upstream side intake air pressure upstream of the throttle valve and a downstream side intake air pressure downstream of the throttle valve, and an amount of intake air supplied into the cylinder is estimated on the basis of the amount of intake air passing through the throttle valve, the upstream side intake air pressure used at the time when the amount of intake air passing through the throttle valve is calculated is detected or calculated to take account of a pressure loss, produced by at least an air-cleaner, from the atmospheric pressure.

9 Claims, 3 Drawing Sheets

DEVICE FOR ESTIMATING AN AMOUNT OF INTAKE AIR OF AN INTERNAL COMBUSTION ENGINE

TECHNICAL FIELD

The present invention relates to a device for estimating an amount of intake air of an internal combustion engine.

BACKGROUND ART

In order to realize precise air-fuel ratio control, it is necessary to decide an amount of injected fuel in regard to the amount of intake air actually supplied into the cylinder. To detect the amount of intake air, an air flow meter is usually arranged in the intake system. However, the air flow meter has a delay in its response and, thus, is not capable of correctly detecting the amount of the intake air during a transient condition of the engine. Accordingly, it has been proposed to calculate and estimate an amount of intake air even during a transient condition of the engine. (For example, refer to Japanese Patent Publication Nos. 2002-130039 and 2002-201998.)

In the estimating of the amount of intake air, by modeling the throttle valve, it is necessary to calculate the amount of intake air passing through the throttle valve on the basis of a difference between an intake air pressures upstream of the throttle valve and an intake air pressure downstream thereof. In the above-mentioned prior art, when an amount of intake air passing through the throttle valve is calculated, the intake air pressure downstream of the throttle valve, namely the intake pipe pressure is varied. However, the intake air pressure upstream of the throttle valve is fixed to the atmospheric pressure. Thus, a precise amount of intake air passing through the throttle valve cannot be calculated. Therefore, a precise amount of intake air supplied into the cylinder cannot be estimated.

DISCLOSURE OF THE INVENTION

Therefore, it is an object of the present invention to provide a device for estimating an amount of intake air of an internal combustion engine that can estimate an amount of intake air supplied into the cylinder more accurately than in the prior arts.

A device for estimating an amount of intake air of an internal combustion engine disclosed in claim 1, according to the present invention, in which an amount of intake air passing through the throttle valve is calculated by using of an upstream side intake air pressure upstream of the throttle valve and a downstream side intake air pressure downstream of the throttle valve, and an amount of intake air supplied into the cylinder is estimated on the basis of the amount of intake air passing through the throttle valve, is characterized such that the upstream side intake air pressure used at the time when the amount of intake air passing through the throttle valve is calculated is detected or calculated to take account of a pressure loss, produced by at least an air-cleaner, from the atmospheric pressure.

The upstream side intake air pressure used at the time when the amount of intake air passing through the throttle valve is calculated is actually different from the atmospheric pressure because there is a pressure loss upstream of the throttle valve in the intake system. Accordingly, in the device for estimating an amount of intake air of an internal combustion engine disclosed in claim 1, the upstream side intake air pressure is detected or calculated to take account of a pressure loss produced by at least an air-cleaner from the atmospheric pressure.

A device for estimating an amount of intake air of an internal combustion engine disclosed in claim 2 according to the present invention is characterized such that, in the device disclosed in claim 1, the upstream side intake air pressure, used at the time when the amount of intake air passing through the throttle valve at this time is calculated, is calculated by subtracting the pressure loss produced by the air-cleaner from the atmospheric pressure, the pressure loss is calculated by using of an amount of intake air detected by the air-flow meter or the amount of intake air passing through the throttle valve calculated at the last time, as an amount of intake air passing through the air-cleaner.

A device for estimating an amount of intake air of an internal combustion engine disclosed in claim 3 according to the present invention is characterized such that, in the device disclosed in claim 2, the upstream side intake air pressure at this time is calculated by calculating the pressure loss by using of the amount of intake air passing through the throttle valve calculated at the last time, the amount of intake air passing through the throttle valve at this time is calculated by using of the calculated upstream side intake air pressure at this time and the downstream side intake air pressure at this time, and the calculated amount of intake air passing through the throttle valve at this time is corrected by a difference between an assumed amount of intake air passing through the throttle valve at the last time calculated by using of the upstream side intake air pressure at this time and the downstream side intake air pressure at the last time, and the amount of intake air passing through the throttle valve at the last time calculated by using of the upstream side intake air pressure at the last time and the downstream side intake air pressure at the last time.

The upstream side intake air pressure at this time, on the basis of the amount of intake air passing through the throttle valve calculated at the last time, is actually near to the upstream side intake air pressure at the last time. Therefore, the assumed amount of intake air passing through the throttle valve at the last time calculated by using of the upstream side intake air pressure at this time and the downstream side intake air pressure at the last time is nearer to the real value than the amount of intake air passing through the throttle valve at the last time calculated by using of the upstream side intake air pressure at the last time and the downstream side intake air pressure at the last time. Accordingly, it can be shown that the difference between the assumed amount of intake air passing through the throttle valve at the last time and the amount of intake air passing through the throttle valve at the last time is a calculation error. Thus, in the device for estimating an amount of intake air of an internal combustion engine disclosed in claim 3, the amount of intake air passing through the throttle valve at this time calculated by using of the upstream side intake air pressure at this time and the downstream side intake air pressure at this time is corrected by the difference between the assumed amount of intake air passing through the throttle valve at the last time and the amount of intake air passing through the throttle valve at the last time.

A device for estimating an amount of intake air of an internal combustion engine disclosed in claim 4 according to the present invention is characterized such that, in the device disclosed in claim 3, when the assumed amount of intake air passing through the throttle valve at the last time is calculated, the downstream side intake air pressure at the last time is recalculated on the basis of the assumed amount of intake air passing through the throttle valve at the last time. In the device for estimating an amount of intake air of an internal combustion engine disclosed in claim 4, the downstream side intake air pressure at the last time is recalculated on the basis of the assumed amount of intake air passing through the throttle valve at the last time that is near to the real value.

A device for estimating an amount of intake air of an internal combustion engine disclosed in claim 5 according to the present invention is characterized such that, in the device disclosed in any one of claims 1–4, the amount of intake air passing through the throttle valve is calculated on the basis of a ratio the downstream side intake air pressure to the upstream side intake air pressure and an open area or an opening degrees of the throttle valve.

A device for estimating an amount of intake air of an internal combustion engine disclosed in claim 6 according to the present invention is characterized such that, in the device disclosed in claim 5, the amount of intake air passing through the throttle valve is calculated by multiplying a first function including the open area or the opening degrees of the throttle valve as a single variable, by a second function including said ratio as a variable, by a first correction term for correcting said first function on the basis of a current intake air temperature upstream of the throttle valve and by a second correction term for correcting said first function on the basis of the current upstream side intake air pressure.

DESCRIPTION OF THE PREFERRED EMBODIMENT

Figure 1:
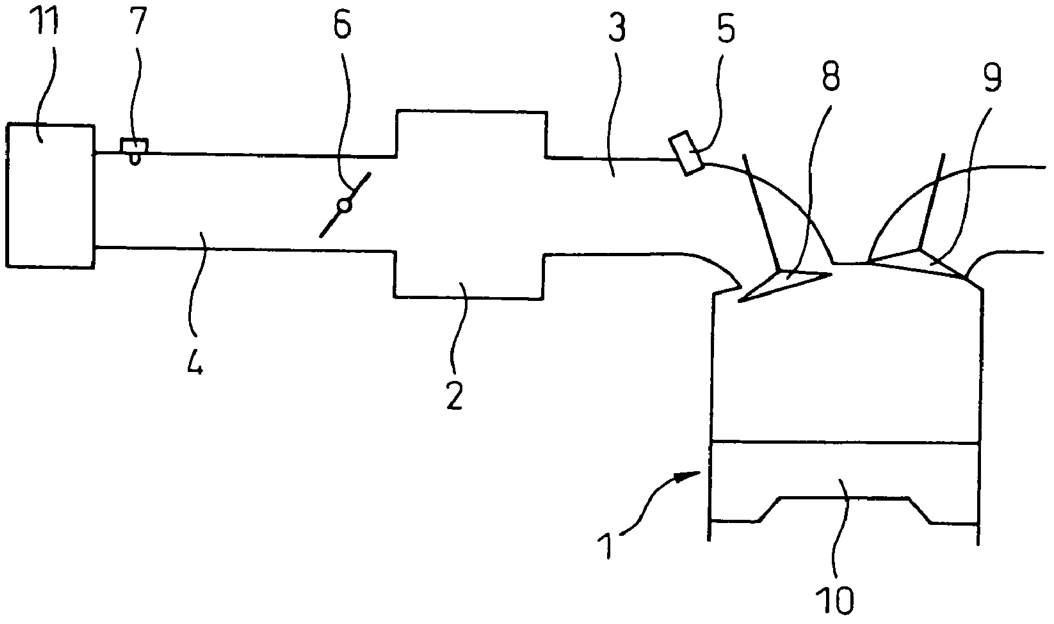
FIG. 1 is a view schematically illustrating an internal combustion engine furnished with a device for estimating the amount of intake air according to the present invention.

FIG. 1 is a view schematically illustrating an internal combustion engine furnished with a device for estimating the amount of intake air according to the present invention. In FIG. 1, reference numeral 1 denotes an engine body, and 2 denotes a surge tank common to all cylinders. Reference numeral 3 denotes an intake branch pipe for communicating the surge tank 2 with each cylinder, and 4 is an intake air passage upstream of the surge tank 2. A fuel injector 5 is arranged in each intake branch pipe 3, and a throttle valve 6 is arranged in the intake air passage 4 just upstream of the surge tank 2. The throttle valve 6 may be connected to the accelerator pedal. However, here, the throttle valve 6 is allowed to be freely opened by a drive device such as a step motor. Reference numeral 7 denotes an intake air pressure sensor for detecting a pressure upstream of the throttle valve 6 in the intake air passage 4. This upstream side intake air pressure is lower than the atmospheric pressure during the engine operating because an air-cleaner 11 arranged at the most upstream portion in the engine intake system produces a pressure loss.

In order to bring a combustion air-fuel ratio in the internal combustion engine 1 into a desired air-fuel ratio, for example a stoichiometric air-fuel ratio, it is necessary to correctly estimate the amount of intake air supplied into the cylinder inclusive of that supplied during a transient operating period of the engine. In the present embodiment, the amount of intake air is estimated by modeling the engine intake system as follows.

First, upon modeling the throttle valve 6 and by using the law of conservation of energy, the law of conservation of momentum and the equation of state when the intake air passes through the throttle valve 6, the amount ($mt_{(i)}$) (g/sec) of air passing through the throttle valve at this time is expressed by the following formula (1). In the following and subsequent formulas, the subscript (i) in the variable of the amount of air passing through the throttle valve or the like represents this time (the present), and (i−1) represents the last time.

$$mt_{(i)} = \mu_{(i)} \cdot A_{(i)} \cdot \frac{Pac_{(i)}}{\sqrt{R \cdot Ta_{(i)}}} \cdot \Phi(Pm_{(i)}/Pac_{(i)}) \tag{1}$$

$$= \mu_{(i)} \cdot A_{(i)} \cdot \frac{Pa0}{\sqrt{R \cdot T0}} \cdot \sqrt{\frac{T0}{Ta_{(i)}}} \cdot \frac{Pac_{(i)}}{Pa0} \cdot \Phi(Pm_{(i)}/Pac_{(i)}) \tag{1$'$}$$

$$= \mu_{(i)} \cdot A_{(i)} \cdot \frac{Pa0}{\sqrt{R \cdot T0}} \cdot ktha \cdot kpac \cdot \Phi(Pm_{(i)}/Pac_{(i)}) \tag{1$''$}$$

$$= F(TA_{(i)}) \cdot ktha \cdot kpac \cdot \Phi(Pm_{(i)}/Pac_{(i)}) \tag{1$'''$}$$

Figure 2:
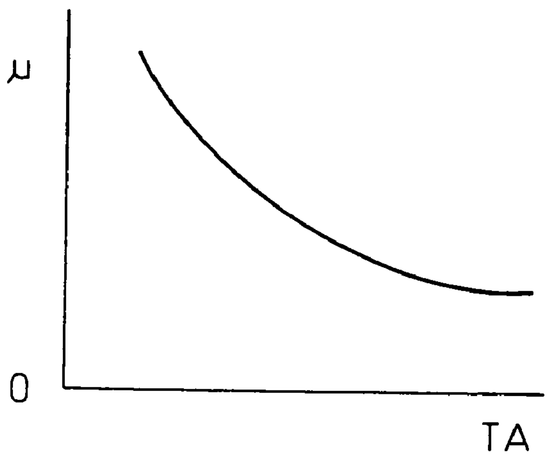
FIG. 2 is a map illustrating a relationship between the open degrees (TA) of throttle valve and the flow rate coefficient (μ).
Figure 3:
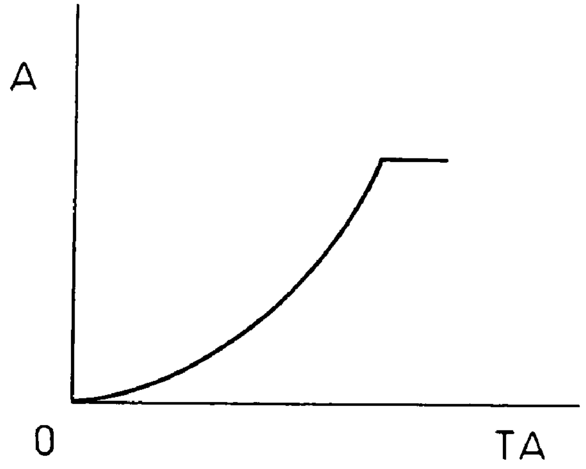
FIG. 3 is a map illustrating a relationship between the opening degrees (TA) of throttle valve and the open area (A) of the throttle valve.

Here, ($\mu_{(i)}$) is a flow coefficient, and ($A_{(i)}$) is an open area ($m^3$) of the throttle valve 6. When the engine intake system is provided with an idle speed control valve (ISC valve), the open area of the ISC valve is added to ($A_{(i)}$) as a matter of course. The flow coefficient and the open area of the throttle valve are the functions of the opening degrees of the throttle valve ($TA_{(i)}$) (degrees), and FIGS. 2 and 3 illustrate maps regarding the opening degrees of the throttle valve (TA). (R) is the gas constant, (Ta) is a temperature (K) of the intake air upstream of the throttle valve, ($Pac_{(i)}$) is an upstream side intake air pressure (kPa) upstream of the throttle valve, and ($Pm_{(i)}$) is an intake pipe pressure downstream of the throttle valve, i.e., a downstream side intake air pressure (kPa). Further, a function (Φ) is described later.

By the way, the formula (1) can be replaced with the formula (1)' by using the standard value (T0) of the intake air temperature upstream of the throttle valve and the standard value (Pa0) of the upstream side intake air pressure. A first correction term (ktha) is one to convert the standard value (T0) of the intake air temperature to the current intake air temperature (Ta). A second correction term (kpac) is one to convert the standard value (Pa0) of the upstream side intake air pressure to the current upstream side intake air pressure ($Pac_{(i)}$). Therefore, the formula (1)' can be replaced with the formula (1)". Further, the formula (1)" can be replaced with the formula (1)'" that is a form multiplying a function ($F(TA_{(i)})$) including the opening degrees ($TA_{(i)}$) of the throttle valve as an only variable, by the function (Φ), by the first correction term (ktha) and by the second correction term (kpac). In the replaced formula (1)'", the function (F) can be easily made a map and therefore the amount ($mt_{(i)}$) of intake air passing through the throttle valve can be easily calculated.

Here, the function (F) may be replaced with a function including the open area ($A_{(i)}$) of the throttle valve as the only variable. The current temperature of intake air upstream of the throttle valve ($Ta_{(i)}$) used at the time when the current first correction term ($ktha_{(i)}$) is calculated is preferably detected by a temperature sensor (not shown) arranged upstream of the throttle valve 6 in the intake air passage 4. It can be shown that this intake air temperature is almost equal to the atmospheric temperature regardless of the pressure loss produced by the air-cleaner 11. The atmospheric temperature detected by the atmospheric temperature sensor may be used as the intake air temperature.

On the other hand, the upstream side intake air pressure varies every moment and thus the current upstream side intake air pressure ($Pac_{(i)}$) is preferably detected by the pressure sensor 7 every time the amount of intake air (mt) passing through the throttle valve is calculated. This intake air pressure is used to calculate the second correction term ($kpac_{(i)}$).

Figure 4:
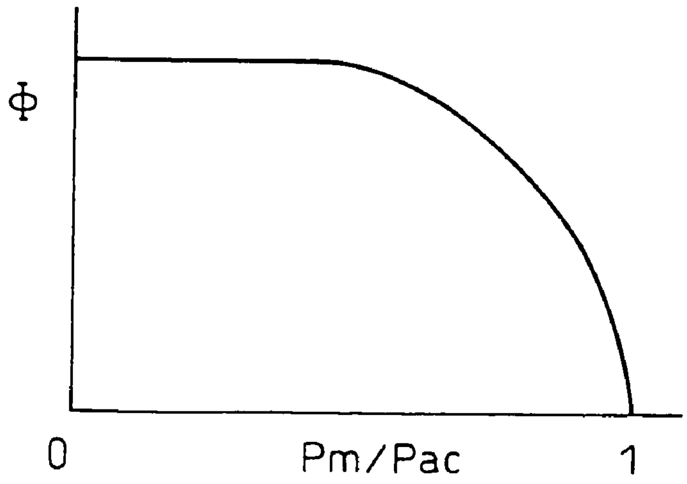
FIG. 4 is a map illustrating a relationship between the function (Φ) and the ratio the intake pipe pressure (Pm) to the upstream side intake air pressure (Pac).

The function $\Phi(Pm_{(i)}/Pac_{(i)})$ is represented by the following formula (2) by using a specific heat ratio (κ), and FIG. 4 illustrates a map regarding (Pm/Pac).

$$\text{Under}\frac{Pm_{(i)}}{Pac_{(i)}} \le \frac{1}{\kappa+1} \tag{2}$$

$$\Phi(Pm_{(i)}/Pac_{(i)}) = \sqrt{\frac{\kappa}{2\cdot(\kappa+1)}}$$

$$\text{Under}\frac{Pm_{(i)}}{Pac_{(i)}} > \frac{1}{\kappa+1}$$

$$\Phi(Pm_{(i)}/Pac_{(i)}) = \sqrt{\left\{\frac{\kappa-1}{2\cdot\kappa}\cdot\left(1-\frac{Pm_{(i)}}{Pac_{(i)}}\right)+\frac{Pm_{(i)}}{Pac_{(i)}}\right\}\cdot\left(1-\frac{Pm_{(i)}}{Pac_{(i)}}\right)}$$

By the way, in the formula (1) (or the formula (1)''') and the formula (2), the upstream side intake air pressure ($Pac_{(i)}$) can be calculated without the use of the pressure sensor 7. The difference between the atmospheric pressure (Pa) and the upstream side intake air pressure (Pac) can be represented by the following formula (3) on the basis of the Bernoulli's theorem.

$$Pa - Pac = \frac{1}{2}\rho v^2 = k\frac{Ga^2}{\rho} \tag{3}$$

$$= \frac{k}{\rho 0}\cdot Ga^2\cdot\frac{1}{ekpa\cdot ektha} \tag{3'}$$

$$= \frac{f(Ga)}{ekpa\cdot ektha} \tag{3''}$$

$$Pac_{(i)} = Pa - \frac{f(Ga_{(i)})}{ekpa\cdot ektha} \tag{4}$$

$$= Pa - \frac{f(mt_{(i-1)})}{ekpa\cdot ektha} \tag{4'}$$

Here, (ρ) is the atmospheric density, (v) is a flow velocity of the air passing through the air-cleaner 11, (Ga) is a flow rate of the air passing through the air-cleaner 11, and (k) is a proportional coefficient between (v) and (Ga). When the standard atmospheric density (ρ0), and a pressure correction coefficient (ekpa) and a temperature correction coefficient (ektha) for converting the standard atmospheric density (ρ0) to the current atmospheric density (ρ) are used, the formula (3) can be replaced by the formula (3)'. Further, when a function (f(Ga)) including the flow rate (Ga) as an only variable is used, the formula (3)' can be replaced by the formula (3)''.

The formula (3)'' can be changed to the formula (4) representing the current upstream side intake air pressure ($Pac_{(i)}$). In the formula (4), if an air-flow meter is arranged immediately downstream of the air-cleaner 11, the current flow rate ($Ga_{(i)}$) can be detected by this air-flow meter. Besides, the pressure correction coefficient (ekpa) can be set on the basis of the detected current atmospheric pressure, and the temperature correction coefficient (ektha) can be set on the basis of the detected current atmospheric temperature.

Further, in the formula (4), it is thought that the flow rate of the air passing through the air-cleaner 11 ($Ga_{(i)}$) is the amount of intake air passing through the throttle valve (mt). Therefore, the formula (4) can be deformed as the formula (4)'. However, as explained in the formula (1) (or the formula (1)'''), to calculate the current amount of intake air passing through the throttle valve ($mt_{(i)}$), the current upstream side intake air pressure ($Pac_{(i)}$) is required. Therefore, to calculate the current upstream side intake air pressure ($Pac_{(i)}$), the amount of intake air passing through the throttle valve ($mt_{(i-1)}$) at the last time must be used as the amount of intake air passing through the throttle valve.

Next, the intake valve is modeled. The amount ($mc_{(i)}$) (g/sec) of intake air supplied into the cylinder changes nearly linearly based on the downstream side intake air pressure, i.e., the intake pipe pressure ($Pm_{(i)}$) and can be expressed by the linear function of the following formula (5).

$$mc_{(i)} = \frac{Ta_{(i)}}{Tm_{(i)}}\cdot(a\cdot Pm_{(i)} - b) \tag{5}$$

Here, ($Tm_{(i)}$) is the temperature (K) of the intake air downstream of the throttle valve, and (a) and (b) are parameters for defining the linear function. (b) is a value corresponding to the amount of the burnt gas remaining in the cylinder. When the valve overlap is present, the burnt gas reversely flows into the intake pipe. Therefore, the value (b) increases to a degree that is no longer negligible. Further, when the valve overlap is present and the intake pipe pressure (Pm) is greater than a predetermined pressure, the reverse flow of the burnt gas decreases conspicuously as the intake pipe pressure increase. Therefore, the value (a) is increased while decreasing the value (b) as compared to when the intake pipe pressure is smaller than the predetermined pressure.

Thus, the linear function for calculating the amount of intake air (mc) supplied into the cylinder is different every engine and varies according to the engine operating condition. It is therefore desired to prepare maps of the parameters (a) and (b) every engine and every engine operating condition.

Next, the intake pipe is modeled. By using the law of conservation of mass, the law of conservation of energy, and the equation of state regarding the intake air present in the intake pipe, a change in the ratio of the intake pipe pressure (Pm) and the intake air temperature (Tm) downstream of the throttle valve with the passage of time, is expressed by the following formula (6), and a change in the intake pipe pressure (Pm) with the passage of time, is expressed by the following formula (7). Here, (V) is a volume ($m^3$) of the intake pipe, i.e., a volume downstream of the throttle valve in the intake system, which, concretely, is the sum of volumes of a part of the intake air passage 4, of the surge tank 2 and of the intake branch pipe 3.

$$\frac{d}{dt}\left(\frac{Pm}{Tm}\right)=\frac{R}{V}\cdot(mt-mc) \quad (6)$$

$$\frac{dPm}{dt}=\kappa\cdot\frac{R}{V}\cdot(mt\cdot Ta-mc\cdot Tm) \quad (7)$$

The formulas (6) and (7) are transformed to the following discrete formulas (8) and (9). If the intake pipe pressure ($Pm_{(i)}$) at this time is obtained by the formula (9), then, the intake air temperature ($Tm_{(i)}$) in the intake pipe at this time can be obtained by the formula (8). In the formulas (8) and (9), the discrete time (Δt) is an interval for executing the flowchart (FIG. 5) for calculating the amount ($mc_{(i)}$) of the intake air, and is, for example, 8 ms.

$$\frac{Pm}{Tm}(i)=\frac{Pm}{Tm}(i-1)+\Delta t\cdot\frac{R}{V}\cdot(mt_{(i-1)}-mc_{(i-1)}) \quad (8)$$

$$Pm_{(i)}=Pm_{(i-1)}+\Delta t\cdot\kappa\cdot\frac{R}{V}\cdot(mt_{(i-1)}\cdot Ta_{(i-1)}-mc_{(i-1)}\cdot Tm_{(i-1)}) \quad (9)$$

Next, described below is a flowchart shown in FIG. 5. This flowchart is executed simultaneously with the start of the engine. At step 101, first, the downstream side intake air pressure (the intake pipe pressure) ($Pm_{(i)}$) is calculated by using the formula (9). The formula (9) calculates the intake pipe pressure ($Pm_{(i)}$) at this time based on the intake pipe pressure ($Pm_{(i-1)}$) at the last time (the initial value thereof is the atmospheric pressure (Pa)), the amount ($mt_{(i-1)}$) of the air passing through the throttle valve at the last time, the intake air temperature ($Ta_{(i-1)}$) upstream of the throttle valve at the last time, the amount ($mc_{(i-1)}$) of intake air at the last time and the intake air temperature ($Tm_{(i-1)}$) in the intake pipe at the last time (the initial value thereof is the intake air temperature upstream of the throttle valve). The initial value of the amount ($mt_{(i-1)}$) of intake air passing through the throttle valve is calculated from the formula (1)''' by using the other initial values, and the initial value of the amount ($mc_{(i-1)}$) of intake air supplied into the cylinder is calculated from the formula (5) by using the other initial values.

Then, at step 102, the intake air temperature ($Tm_{(i)}$) in the intake pipe at this time is calculated by using the formula (8). Then, at step 103, the upstream side intake air pressure ($Pac_{(i)}$) is calculated on the basis of the amount ($mt_{(i-1)}$) of the air passing through the throttle valve at the last time by using the formula (4)'. Thus, the downstream side intake air pressure ($Pm_{(i)}$) is calculated at step 101 and the upstream side intake air pressure ($Pac_{(i)}$) is calculated at step 103. Therefore, the current amount ($mt_{(i)}$) of intake air passing through the throttle valve can be calculated on the basis of the current opening degrees of the throttle valve ($TA_{(i)}$) by using the formula (1)'''.

However, the upstream side intake air pressure ($Pac_{(i)}$) at this time calculated at step 103 is on the basis of the amount ($mt_{(i-1)}$) of intake air passing through the throttle valve at the last time. In fact, it is near to the upstream side intake air pressure at the last time. Accordingly, the calculated downstream side intake air pressure ($Pm_{(i)}$) at this time and the calculated upstream side intake air pressure ($Pac_{(i)}$) are not the values at the same time. Therefore, if the function (i) is calculated on the basis of the ratio of these values, the amount ($mt_{(i)}$) of the intake air passing through the throttle valve cannot be calculated precisely.

In the present flowchart, to calculate the amount ($mt_{(i)}$) of the intake air passing through the throttle valve precisely, the following processes are carried out. First, at step 104, an assumed amount ($mt\mathbf{1}_{(i-1)}$) of intake air passing through the throttle valve at the last time is calculated by the following formula (10). The formula (10) is one in which in the formula (1)''', the upstream side intake air pressure ($Pac_{(i)}$) that is near to the value at the last time is maintained, the opening degrees of the throttle valve, the first correction coefficient, the second correction coefficient, and the downstream side intake air pressure are respectively made the values at the last time. Thus, the assumed amount ($mt\mathbf{1}_{(i-1)}$) of intake air passing through the throttle valve at the last time calculated by the formula (10) is near to the real value of the amount of intake air passing through the throttle valve at the last time.

$$mt1_{(i-1)}=F(TA_{(i-1)})\cdot ktha\cdot kpac\cdot\Phi(Pm_{(i-1)}/Pac_{(i)}) \quad (10)$$

When the assumed amount ($mt\mathbf{1}_{(i-1)}$) of intake air passing through the throttle valve at the last time is calculated, the downstream side intake air pressure ($Pm_{(i-1)}$) at the last time is used. However, the amount ($mt_{(i-2)}$) of intake air passing through the throttle valve before the last time used to calculate the downstream side intake air pressure ($Pm_{(i-1)}$) is not reliable. Accordingly, the downstream side intake air pressure ($Pm_{(i-1)}$) at the last time is preferably recalculated on the basis of the assumed amount ($mt\mathbf{1}_{(i-1)}$) of the intake air passing through the throttle valve at the last time. Thus, at step 105, the downstream side intake air pressure ($Pm_{(i-1)}$) at the last time is calculated on the basis of the assumed amount ($mt\mathbf{1}_{(i-1)}$) of intake air passing through the throttle valve at the last time by using of the following formula (11). In the formula (11), the amount of intake air passing through the throttle valve and the calculated downstream side intake air pressure are the values at the same time differently form in the formula (9).

$$Pm_{(i-1)}=Pm_{(i-2)}+\Delta t\cdot\kappa\cdot\frac{R}{V}(mt1_{(i-1)}\cdot Ta_{(i-1)}-mc_{(i-1)}\cdot Tm_{(i-1)}) \quad (11)$$

Thus, the downstream side intake air pressure ($Pm_{(i-1)}$) at the last time is recalculated. Next, at step 106, the downstream side intake air temperature ($Tm_{(i-1)}$) at the last time is recalculated by using of the formula (8) and at step 107, the amount ($mc_{(i-1)}$) of intake air supplied into the cylinder at the last time is recalculated by using the formula (5).

Next, at step 108, a new assumed amount ($mt\mathbf{2}_{(i-1)}$) of intake air passing through the throttle valve at the last time is calculated on the basis of the downstream side intake air pressure ($Pm_{(i-1)}$) at the last time recalculated at step 105 by using of the same formula as the formula (10). The upstream side intake air pressure ($Pac_{(i)}$) used at the time when the ($mt\mathbf{2}_{(i-1)}$) is calculated may be recalculated on the basis of the ($mt_{(i-1)}$). Thus, the calculated new assumed amount ($mt\mathbf{2}_{(i-1)}$) of intake air passing through the throttle valve at the last time is nearer to the real value.

Next, at step 109, it is determined if the difference between the new assumed amount ($mt\mathbf{2}_{(i-1)}$) of intake air passing through the throttle valve at the last time and the old assumed amount ($mt\mathbf{1}_{(i-1)}$) of intake air passing through the throttle valve at the last time is smaller than a set value (d). Namely, it is determined if the new assumed amount ($mt\mathbf{2}_{(i-1)}$) converges sufficiently on the real value. When the result at step 109 is negative, the old assumed amount ($mt\mathbf{1}_{(i-1)}$) of intake air passing through the throttle valve at the last time is replaced by the new assumed amount ($mt\mathbf{2}_{(i-1)}$) of intake air passing through the throttle valve at the last time at step 110. Thereafter, the processes after step 104 are repeated. In this case, at step 105, only the assumed amount ($mt\mathbf{1}_{(i-1)}$) of intake air passing through the throttle valve at the last time does not become near to the real value thereof, but the downstream side intake air temperature ($Tm_{(i-1)}$) at the last time and the mount ($mc_{(i-1)}$) of intake air supplied into the cylinder at the last time also become near to the real values thereof. Therefore, the calculated downstream side intake air pressure ($Pm_{(i-1)}$) at the last time also becomes nearer to the real value thereof.

When the result at step 109 is positive, the assumed amount ($mt\mathbf{2}_{(i-1)}$) of intake air passing through the throttle valve at the last time almost becomes the real value thereof. Therefore, the difference between this assumed amount ($mt\mathbf{2}_{(i-1)}$) of intake air passing through the throttle valve at the last time and the amount ($mt_{(i-1)}$) of intake air passing through the throttle valve at the last time calculated by using of the formula (1)''' represents relative precisely a calculation error in the case of using the formula (1)'''. Accordingly, at step 111, the amount ($mt_{(i)}$) of intake air passing through the throttle valve at this time calculated by using of the formula (1)''' is corrected by the above calculation error, and thus the precise amount ($mt_{(i)}$) of intake air passing through the throttle valve at this time can be calculated.

The opening degrees ($TA_{(i)}$) of the throttle valve at this time used to calculate the amount ($mt_{(i)}$) of the air passing through the throttle valve at this time is estimated to be delayed, in the response of the drive device of the throttle valve (step motor), regarding the amount of accelerator pedal depression.

Next, at step 112, the amount of intake air ($mc_{(i)}$) at this time is calculated by using the formula (5) on the basis of the downstream side intake air pressure ($Pm_{(i)}$) at this time calculated at step 101 and the downstream side intake air temperature ($Tm_{(i)}$) at this time calculated at step 102. As mentioned above, the precise amount of intake air passing through the throttle valve is calculated and thus the downstream side intake air pressure calculated on the basis of this amount becomes precise. Further, the amount of intake air supplied into the cylinder calculated on the basis of this pressure also become precise. Next, although the flowchart does not show it, the downstream side intake air pressure ($Pm_{(i)}$) at this time, the downstream side intake air temperature ($Tm_{(i)}$) at this time, the amount ($mt_{(i)}$) of intake air passing through the throttle valve at this time, the amount ($mc_{(i)}$) of intake air supplied into the cylinder at this time, and the upstream side intake air temperature ($Ta_{(i)}$) are memorized as each value at the last time and thus are prepared to carry out the flowchart instructions the next time.

Figure 5:
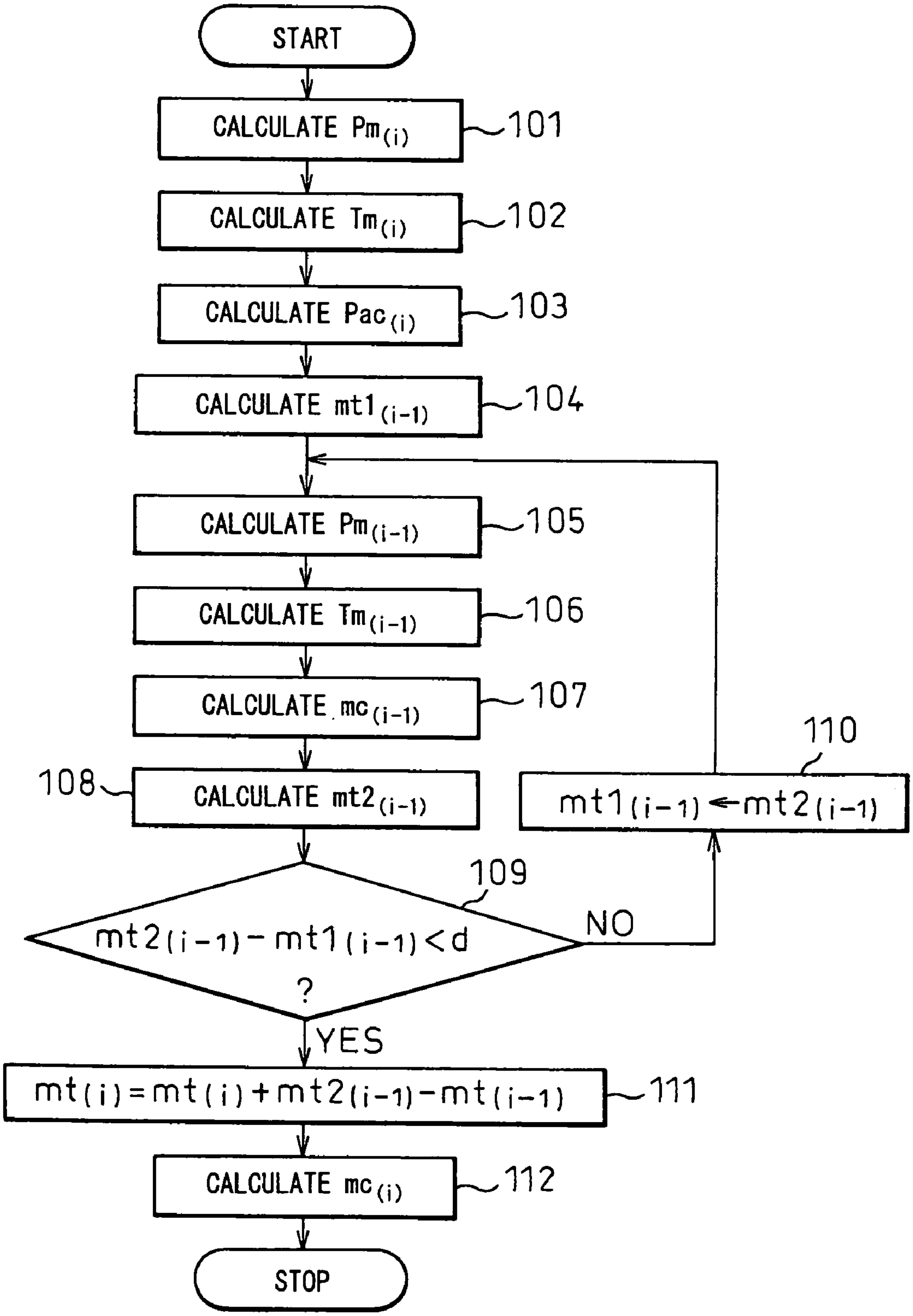
FIG. 5 is a flowchart for calculating the amount of intake air supplied into the cylinder.

In the flowchart shown in FIG. 5, until the assumed amount ($mt\mathbf{2}_{(i-1)}$) of intake air passing through the throttle valve at the last time becomes sufficiently near to the real value thereof (the result at step 109 becomes positive), the calculations of the downstream side intake air pressure ($Pm_{(i-1)}$) at the last time and the assumed amount ($mt\mathbf{2}_{(i-1)}$) of intake air passing through the throttle valve at the last time are repeated. However, the calculation repeat times may be predetermined. Besides, the processes from step 105 to step 110 may be omitted and thus, the amount ($mt_{(i)}$) of intake air passing through the throttle valve at this time is calculated at step 111, immediately after the assumed amount ($mt\mathbf{1}_{(i)}$) of intake air passing through the throttle valve at the last time is calculated at step 104. In this case, ($mt\mathbf{2}_{(i-1)}$) on the formula at step 111 may be replaced by ($mt\mathbf{1}_{(i-1)}$).

By the way, to correctly control the combustion air-fuel ratio, the amount of intake air supplied to the cylinder must be correctly estimated to determine the amount of injected fuel prior to starting the fuel injection. Strictly speaking, however, to correctly estimate the amount of intake air, the flow rate of the intake air at the time when the intake valve is closed must be calculated. Namely, when the amount of injected fuel is determined, it is necessary to calculate not the present amount ($mc_{(i)}$) of the intake air but the amount ($mc_{(i+n)}$) of the intake air at the time when the intake valve is closed. This is not only for an internal combustion engine that injects the fuel into the intake branch pipe 3 as shown in FIG. 1 but also for the internal combustion engines that directly inject fuel into the cylinder in the intake stroke At present, therefore, it is necessary to calculate the amount (mt) of the air passing through the throttle valve each time by changing (TA) in the formula (1)''' relying upon not only the opening degrees of the throttle valve ($TA_{(i)}$) at this time but also the opening degrees of the throttle valve ($TA_{(i+1)}$), ($TA_{(i+2)}$), - - - , ($TA_{(i+n)}$) for each time ($\Delta t$) until the intake valve is closed.

Presuming that an amount of change in the accelerator pedal depression at the present time continues until the intake valve is closed, the opening degrees of the throttle valve (TA) each time can be determined by taking into consideration a delay of response of the throttle valve actuator for each estimated amount of accelerator pedal depression by estimating the amount of accelerator pedal depression in each of the times based on the amount of change in the accelerator pedal depression in the present time. This method can also be applied even when the throttle valve is mechanically coupled to the accelerator pedal.

However, the thus estimated opening degrees of the throttle valve ($TA_{(i+n)}$) at the time when the intake valve is closed is simply an estimate, and there is no guarantee that it is in agreement with the real value. To bring the opening degrees of the throttle valve ($TA_{(i+n)}$) at the time when the intake valve is closed into agreement with the real value, the throttle valve may be controlled to be delayed. When the amount of depression of the accelerator pedal changes, the opening degrees of the throttle valve changes in a delayed manner due to a delay in the response of the actuator. This delay control is to intentionally increase a delay in the response of the throttle valve.

During, for example, the transient operation of the engine, the opening degrees of the throttle valve corresponding to the amount of depressing the accelerator pedal at the present time when the amount of injected fuel is determined may be realized at the time of closing the intake valve to control the actuator of the throttle valve by taking the real delay in response (the waste time) into consideration. Therefore, it is possible to correctly learn the opening degrees of the throttle valve ($TA_{(i)}$), ($TA_{(i+1)}$), - - - , ($TA_{(i+n)}$) for each of the times from the present time until the intake valve is closed. More concretely, when the amount of depression of the accelerator pedal is varied, the operation signal is not readily sent to the actuator but, instead, the operation signal may be sent to the actuator when a period elapses, the period being obtained by subtracting the waste time from a period from when the amount of injected fuel is determined to when the intake valve is closed. It is of course possible to control the delay of the throttle valve so that the opening degrees of the throttle valve corresponding to the present amount of depressing the accelerator pedal is realized after the intake valve is closed.

Thus, according to a device for estimating an amount of intake air of an internal combustion engine of the present invention, an upstream side intake air pressure used to calculate an amount of intake air passing through the throttle valve is detected by a pressure sensor arranged upstream of the throttle valve in the intake air passage to take account of a pressure loss, produced by at least an air-cleaner, from the atmospheric pressure, or is calculated to take account of a pressure loss, produced by at least an air-cleaner, from the atmospheric pressure. Therefore, as compared to when the atmospheric pressure is used as the upstream side intake air pressure, the calculated amount of intake air passing through the throttle valve becomes more precise and thus an amount of intake air supplied into the cylinder calculated by using of this amount of intake air passing through the throttle valve can become more precise.

The invention claimed is:

1. A device for estimating an amount of intake air of an internal combustion engine, wherein an amount of intake air passing through the throttle valve is calculated by using an upstream side intake air pressure upstream of the throttle valve and a downstream side intake air pressure downstream of the throttle valve, and an amount of intake air supplied into the cylinder is estimated on the basis of the amount of intake air passing through the throttle valve, characterized in that the upstream side intake air pressure, used at the time when the amount of intake air passing through the throttle valve is calculated, is detected or calculated to take account of a pressure loss, produced by at least an air-cleaner, from the atmospheric pressure.

2. A device for estimating an amount of intake air of an internal combustion engine according to claim 1, characterized in that the amount of intake air passing through the throttle valve is calculated on the basis of a ratio the downstream side intake air pressure to the upstream side intake air pressure, and an open area or an opening degree of the throttle valve.

3. A device for estimating an amount of intake air of an internal combustion engine according to claim 2, characterized in that the amount of intake air passing through the throttle valve is calculated by multiplying a first function including the open area or the opening degree of the throttle valve as an only variable, by a second function including said ratio as a variable, by a first correction term for correcting said first function on the basis of a current intake air temperature upstream of the throttle valve and by a second correction term for correcting said first function on the basis of the current upstream side intake air pressure.

4. A device for estimating an amount of intake air of an internal combustion engine according to claim 1, characterized in that the upstream side intake air pressure used at the time when the amount of intake air passing through the throttle valve at this time is calculated is calculated by subtracting the pressure loss produced by the air-cleaner from the atmospheric pressure, the pressure loss is calculated by using an amount of intake air detected by the air-flow meter or the amount of intake air passing through the throttle valve calculated at the last time, as an amount of intake air passing through the air-cleaner.

5. A device for estimating an amount of intake air of an internal combustion engine according to claim 4, characterized in that the amount of intake air passing through the throttle valve is calculated on the basis of a ratio the downstream side intake air pressure to the upstream side intake air pressure, and an open area or an opening degree of the throttle valve.

6. A device for estimating an amount of intake air of an internal combustion engine according to claim 4, characterized in that the upstream side intake air pressure at this time is calculated by calculating the pressure loss by using of the amount of intake air passing through the throttle valve calculated at the last time, the amount of intake air passing through the throttle valve at this time is calculated by using of the calculated upstream side intake air pressure at this time and the downstream side intake air pressure at this time, and the calculated amount of intake air passing through the throttle valve at this time is corrected by a difference between an assumed amount of intake air passing through the throttle valve at the last time calculated by using the upstream side intake air pressure at this time and the downstream side intake air pressure at the last time, and the amount of intake air passing through the throttle valve at the last time calculated by using of the upstream side intake air pressure at the last time and the downstream side intake air pressure at the last time.

7. A device for estimating an amount of intake air of an internal combustion engine according to claim 6, characterized in that the amount of intake air passing through the throttle valve is calculated on the basis of a ratio the downstream side intake air pressure to the upstream side intake air pressure, and an open area or an opening degree of the throttle valve.

8. A device for estimating an amount of intake air of an internal combustion engine according to claim 6, characterized in that when the assumed amount of intake air passing through the throttle valve at the last time is calculated, the downstream side intake air pressure at the last time is recalculated on the basis of the assumed amount of intake air passing through the throttle valve at the last time.

9. A device for estimating an amount of intake air of an internal combustion engine according to claim 8, characterized in that the amount of intake air passing through the throttle valve is calculated on the basis of a ratio the downstream side intake air pressure to the upstream side intake air pressure, and an open area or an opening degree of the throttle valve.

* * * * *